United States Patent [19]

Eisenbach et al.

[11] 4,218,336

[45] Aug. 19, 1980

[54] PROCESS FOR THE SEPARATION OF TRIPHENYLPHOSPHINE RHODIUM HALIDE CATALYSTS

[75] Inventors: Dieter Eisenbach, Riedstadt; Werner Gosewinkel, Hirschberg-Groszsachsen, both of Fed. Rep. of Germany

[73] Assignee: Boehringer Mannheim GmbH, Mannheim, Fed. Rep. of Germany

[21] Appl. No.: 947,293

[22] Filed: Sep. 29, 1978

[30] Foreign Application Priority Data

Oct. 11, 1977 [DE] Fed. Rep. of Germany ....... 2745662

[51] Int. Cl.² .................. B01J 31/40; B01J 31/24; B01J 23/96; C07B 1/00
[52] U.S. Cl. .................. 252/411 R; 75/109; 252/413; 252/414; 423/22
[58] Field of Search ........... 252/414, 412, 420, 411 R, 252/413; 423/22; 75/109

[56] References Cited

U.S. PATENT DOCUMENTS

| | | | |
|---|---|---|---|
| 3,545,963 | 12/1970 | Wakamatsu et al. | 75/109 |
| 4,131,640 | 12/1978 | Von Kuterow et al. | 252/411 R |

FOREIGN PATENT DOCUMENTS 2311388  9/1974  Fed. Rep. of Germany ........... 252/414

*Primary Examiner*—P. E. Konopka
*Attorney, Agent, or Firm*—Sprung, Felfe, Horn, Lynch & Kramer

[57] ABSTRACT

The present invention provides a process for the separation of a triphenylphosphine rhodium halide catalyst from a polar, organic solution which contains other substances hydrogenated by means of homogeneous catalysts and hydrogen, comprising adding to the solution a solid adsorption agent and a reducing agent with a redox potential of less than about −0.1 volt, allowing the mixture to react and, after completion of the reaction, separating the adsorption agent with the adsorbed rhodium from the solution.

9 Claims, No Drawings

PROCESS FOR THE SEPARATION OF TRIPHENYLPHOSPHINE RHODIUM HALIDE CATALYSTS

The present invention is concerned with a process for the separation of triphenylphosphine rhodium halide catalysts from polar organic solutions.

In the case of hydrogenation reactions, use is mainly made of heterogenous catalysts, such as metallic nickel, platinum, palladium and the like, either as such or absorbed on to large surface area carrier materials. These catalysts can be easily removed from the reaction solutions by filtration or centrifuging. However, a disadvantage of these catalysts is that their active centers are poisoned relatively easily by impurities and the heterogeneous reaction requires, for satisfactory rates of reaction, large amounts of catalyst, high temperatures and high hydrogen pressures.

German Patent Specification Nos. 1,793,616 and 1,568,817 describe rhodium complexes and especially triphenylphosphine rhodium halides which are soluble in polar organic solvents or solvent mixtures and can be employed as homogeneous hydrogenation catalysts for a large variety of hydrogenation reactions. In the case of dissolved catalysts, an adsorptive inactivation is, of course, not possible, a chemical inactivation only taking place when the catalyst poisons are present in the same amount as the catalyst. However, in comparison with the heterogenous catalysts, it is disadvantageous that these homogeneous catalysts are, in many cases, chemically or physically so similar to the hydrogenated substances that their separation gives rise to difficulties. Thus, in the case of a precipitation of the hydrogenated substance, which is normally present in large excess, by the addition of appropriate precipitation agents or by crystallization by concentration of the reaction solution, in many cases some of the catalyst is entrained and, even by recrystallization, can only be removed with difficulty and with large losses of yield.

Attempts to bind the catalyst by adsorption on to active surfaces, such as active charcoal, cellulose, ion exchangers and the like, are also only partially successful since, on the one hand, the catalyst can only be adsorbed with difficulty and, on the other hand, in the case of the use of comparatively large amounts of adsorption agent, the hydrogenated substance is normally also adsorbed in comparatively large amounts and cannot be leached out again since the catalyst is thereby again desorbed.

Thus, the problem exists of finding a process in which the catalyst can be separated as completely as possible in a simple manner which also is not harmful for the hydrogenated substance.

Surprisingly, we have now found that it is possible to adsorb the catalyst practically completely from the reaction solution on to a solid adsorption agent (large surface area carrier material) when, to the solution, there is simultaneously added a reducing agent with a reduction potential of less than about $-0.1$ volt.

Thus, according to the present invention, there is provided a process for the separation of a triphenyl phosphine rhodium halide catalyst from a polar, organic solution which contains other substances hydrogenated by means of homogeneous catalysts and hydrogen, wherein a solid adsorption agent and a reducing agent with a redox potential of less than $-0.1$ volt is added to the solution, the mixture is allowed to react and, after ending of the reaction, the adsorption agent with the adsorbed rhodium, as well as excess solid reducing agent possibly present, are separated from the solution.

Although the mechanism of the separation has still not been completely investigated, it is assumed that, under these conditions, rhodium is liberated in metallic form from the catalyst complex and is adsorbed on to the adsorption agent.

The adsorption agents used are preferably those with a large surface area, such as active charcoal, silica gel, aluminum oxide, cellulose and cellulose derivatives, asbestos and the like. Active charcoal and cellulose, which, when calcined, leave practically no residue, are preferred since the expensive rhodium can be recovered particularly easily from the ash.

As reducing agents, hydrogen, stannous and ferrous ions have proved to be useless but powdered aluminum, zinc, iron and tin, as well as sulphide ions, can be used. From the redox potentials of these various reducing agents, it can be deduced that redox potentials of below $-0.1$ volt are necessary in order to achieve a satisfactory separation. Reducing agents which fulfill this condition and do not react with the particular hydrogenated substances can easily be selected for each individual case. Of the reducing agents already mentioned, iron, aluminum and zinc are preferred because of their inexpensiveness and because an excess of reducing agent can be removed from the reaction solution, together with the adsorption agent, by filtration. Separation of the metal powder from the adsorption agent merely requires treatment with a dilute acid.

It is preferred to use 1 to 10 parts by weight of adsorption agent and of reducing agent per 1 part by weight of catalyst. More preferably, there are used 1 to 2 parts by weight of adsorption agent and of reducing agent per 1 part by weight of catalyst.

The speed of reaction with which the rhodium complex is separated out from the solution depends not only upon the redox potential of the reducing agent and the amount of adsorption agent but also upon the polarity of the reaction medium. It has proved to be advantageous to increase the polarity as much as possible by adding a lower alcohol or especially water. Of course, it is also advantageous to accelerate the reaction by increasing the temperature, provided that the substance of interest in the particular case can withstand elevated temperatures.

The following illustrative examples demonstrate how the process according to the present invention can be varied:

Experimental Protocoll

For the following examples, insofar as nothing is stated to the contrary, use is made of a hydrogenated solution which comprises 300 liters of a 9:1 v/v mixture of acetone and methanol as solvent, 20 kg. of a hydrogenated steroid and 150 g. triphenyl phosphine rhodium chloride as catalyst.

EXAMPLE 1

Adsorption of triphenyl phosphine rhodium chloride on adsorption agents

1 Liter amounts of the above solution, containing 0.5 g. of catalyst, were heated to the boil with 10 g. of the adsorption agents mentioned in the following Table 1 for 15 minutes, cooled, filtered and the residual content of catalyst in the filtrate determined. A prolongation of the period of heating and an alteration of the pH value of the solution did not change the adsorption.

TABLE 1

| adsorption agent | residual content (g.) | Adsorption (%) |
|---|---|---|
| active charcoal LS Supra | 0.33 | 33 |
| active charcoal GW | 0.30 | 40 |
| Carboraffin C | 0.17 | 66 |
| Amberlite XAD-2 (non-ionic, non-polar) | 0.25 | 50 |
| Amberlite XAD-7 (non-ionic, polar) | 0.48 | 5 |
| Lewatit TSW 40 (H-form) | 0.29 | 41 |
| Lewatit SP 112 (Na-form) | 0.36 | 28 |
| Lewatit MP 500 (OH-form) | 0.20 | 60 |
| Lewatit MP 500 (Cl-form) | 0.31 | 38 |
| Cellulose | 0.39 | 22 |

EXAMPLE 2

Adsorption of triphenyl phosphine rhodium chloride in the presence of reducing agents 1 Liter amounts of the above solution were heated to the boil during 10 hours with 1 g. active charcoal (Carboraffin C), with the addition of 1 g. of the reducing agents mentioned in the following Table 2 and 250 ml of water, followed by further working up in the manner described in Example 1.

TABLE 2

| reducing agent | redox potential (V) | residual content (g.) | Adsorption (%) |
|---|---|---|---|
| — | — | 0.48 | 3 |
| aluminum powder | − 0.56 | 0.01 | 98 |
| zinc powder | − 0.38 | 0.26 | 48 |
| iron powder | − 0.22 | 0.02 | 97 |
| sodium sulphide | − 0.26 | 0.24 | 62 |
| tin powder | − 0.14 | 0.24 | 63 |
| gaseous hydrogen | ± 0 | 0.45 | 10 |
| stannous chloride | + 0.08 | 0.48 | 3 |
| ferrous sulphide | + 0.39 | 0.48 | 3 |

EXAMPLE 3

Adsorption of triphenyl phosphine rhodium chloride in dependence upon the polarity of the solution The experiments described in Example 2 were repeated with various additions of water but otherwise under the same conditions, the results obtained being given in the following Table 3:

TABLE 3

| reducing agent | water addition (1/1 hydrogenation solution) | Adsorption capacity (%) |
|---|---|---|
| zinc | 0 | 33 |
| | 0.25 | 48 |
| | 0.35 | 73 |
| | 0.50 | 88/96 |
| iron | 0 | 11 |
| | 0.25 | 97/100 |
| aluminum | 0 | 7 |
| | 0.25 | 98/100 |

EXAMPLE 4

Adsorption of triphenyl phosphine rhodium chloride in the presence of reducing agents The experiments described in Example 2 were repeated but with variation of the amounts of active charcoal and of reducing agent. The results obtained are given in the following Table 4:

TABLE 4

| reducing agent | Amount of reducing agent (g/l hydrogenation solution) | Amount of active charcoal (g/l hydrogenation solution) | Adsorption capacity (%) |
|---|---|---|---|
| zinc | 0.05 | 1 | 10 |
| | 0.25 | 0.5 | 58 |
| | 0.25 | 1 | 61 |
| | 0.50 | 0.25 | 59 |
| | 1 | 0.5 | 58 |
| | 1 | 1 | 90 |
| | 2 | 1 | 96 |
| aluminum | 0.5 | 1 | 3 |
| | 0.75 | 1 | 7 |
| | 1 | 1 | 98/100 |
| | 1 | 0.4 | 0 |
| | 1 | 0.7 | 18 |
| iron | 0.5 | 1 | 18 |
| | 0.75 | 1 | 28 |
| | 1 | 1 | 97/100 |
| | 1 | 0.4 | 19 |
| | 1 | 0.7 | 26 |

EXAMPLE 5

Adsorption of tris-triphenyl phosphine rhodium chloride in the presence of reducing agents In the case of the presence of tetrahydrofuran instead of methanol/acetone as solvent for the substance to be hydrogenated, further experiments were carried out analogously to Example 2. With the use of the reducing system formic acid/ammonia, the parameters formic acid, ammonia, active charcoal and amount of water, as well as the period of boiling, were varied. The results obtained are summarized in the following Table 5:

TABLE 5

| Amount of reducing agent (ml/l hydrogenation solution) | | amount of active charcoal (g/l hydrogenation solution) | amount of water (l/l hydrogenation solution) | time (h) | Adsorption capacity (%) |
|---|---|---|---|---|---|
| HCOOH | NH3 conc. | | | | |
| 1 | — | 2 | — | 16 | 21 |
| 1 | — | 4.5 | — | 16 | 23 |
| 1 | — | 4.5 | 0.15 | 16 | 61 |
| 1 | 2.5 | 2 | 0.30 | 16 | 85 |
| 1 | 2.5 | 2 | 0.16 | 16 | 93 |
| 1 | 2.5 | 2 | 0.01 | 16 | 70 |
| 0.5 | 1.25 | 2 | 0.30 | 16 | 59 |
| 1 | 1.88 | 2 | 0.30 | 16 | 81 |
| 1 | 3.8 | 2 | 0.30 | 16 | 85 |

TABLE 5-continued

| Amount of reducing agent (ml/l hydrogenation solution) | | amount of active charcoal (g/l hydrogenation solution) | amount of water (l/l hydrogenation solution) | time (h) | Adsorption capacity (%) |
|---|---|---|---|---|---|
| HCOOH | NH₃ conc. | | | | |
| 1 | 2.5 | 4.5 | 0.30 | 16 | 88 |
| 1 | 2.5 | 4.5 | 0.30 | 1.5 | 56 |
| 1 | 2.5 | 4.5 | 0.30 | 6 | 86 |
| 1 | 2.5 | 4.5 | 0.15 | 2 | 74 |
| 1 | 2.5 | 4.5 | 0.15 | 8 | 95 |
| 1 | 2.5 | 4.5 | 0.15 | 16 | 92 |
| 1 | 2.5 | 4.5 | 0.15 | 1 h boiling 16 h stirring | 75 |
| 1 | 2.5 | 2 | 0.30 | 6 | 68 |

It will be appreciated that the instant specification and examples are set forth by way of illustration and not limitation, and that various modifications and changes may be made without departing from the spirit and scope of the present invention.

What is claimed is:

1. A process for the separation of a triphenylphosphine rhodium halide catalyst from a polar, organic solution which contains other substances hydrogenated by means of homogeneous catalysts and hydrogen, comprising adding to the solution a solid adsorption agent and a reducing agent with a redox potential of less than about −0.1 volt, allowing the mixture to react and, after completion of the reaction, separating the adsorption agent with the adsorbed rhodium from the solution.

2. A process according to claim 1, wherein the adsorption agent used is active charcoal, silica gel, aluminum oxide, cellulose, a cellulose derivative or asbestos.

3. A process according to claim 1, wherein the reducing agent is aluminum, iron, tin or zinc powder.

4. A process according to claim 1, wherein a lower alcohol or water is added to the reaction solution.

5. A process according to claim 1, wherein the reaction solution is heated, thereby accelerating the adsorption of rhodium.

6. A process according to claim 1, wherein about 1 to 10 parts by weight of adsorption agent are used per part by weight of catalyst.

7. A process according to claim 1, wherein about 1 to 10 parts by weight of reducing agent are used per part by weight of catalyst.

8. A process according to claim 1, wherein about 1 to 2 parts by weight of adsorption agent and about 1 to 2 parts by weight of reducing agent are used per part by weight of catalyst.

9. A process according to claim 8, wherein the adsorption agent used is active charcoal, silica gel, aluminum oxide, cellulose, a cellulose derivative or asbestos, the reducing agent is aluminum, iron, tin or zinc powder, a lower alcohol or water is added to the reaction solution, and the reaction solution is heated, thereby accelerating the adsorption of rhodium.

* * * * *